US008968957B2

(12) United States Patent
Goto et al.

(10) Patent No.: US 8,968,957 B2
(45) Date of Patent: Mar. 3, 2015

(54) FUEL CELL

(75) Inventors: Shuhei Goto, Utsunomiya (JP); Tetsuya Nakamura, Utsunomiya (JP); Hiroyuki Tanaka, Utsunomiya (JP); Kentaro Ishida, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 156 days.

(21) Appl. No.: 13/582,320

(22) PCT Filed: Feb. 22, 2011

(86) PCT No.: PCT/JP2011/053822
§ 371 (c)(1),
(2), (4) Date: Aug. 31, 2012

(87) PCT Pub. No.: WO2011/108400
PCT Pub. Date: Sep. 9, 2011

(65) Prior Publication Data
US 2012/0321980 A1    Dec. 20, 2012

(30) Foreign Application Priority Data

Mar. 1, 2010 (JP) .................. 2010-044493

(51) Int. Cl.
| H01M 8/00 | (2006.01) |
| H01M 8/02 | (2006.01) |
| H01M 8/04 | (2006.01) |
| H01M 8/24 | (2006.01) |
| H01M 8/10 | (2006.01) |

(52) U.S. Cl.
CPC .......... *H01M 8/0273* (2013.01); *H01M 8/0284* (2013.01); *H01M 8/1004* (2013.01); *H01M 8/246* (2013.01); *Y02E 60/521* (2013.01)
USPC .......... 429/463; 429/452; 429/467; 429/468; 429/469; 429/470

(58) Field of Classification Search
USPC .................. 429/452–471, 507–511
See application file for complete search history.

(56) References Cited

U.S. PATENT DOCUMENTS

| 2006/0088752 A1 | 4/2006 | Sakano et al. |
| 2008/0268319 A1 | 10/2008 | Sakano et al. |
| 2008/0305368 A1 | 12/2008 | Takahashi et al. |

FOREIGN PATENT DOCUMENTS

| JP | 2006-120562 | 5/2006 |
| JP | 2009-283469 | 12/2009 |

OTHER PUBLICATIONS

Supplementary European Search Report for Application No. 11750512.3, 7 pages, dated Sep. 13, 2013.
International Search Report for Application No. PCT/JP2011/053822, 2 pages, dated May 31, 2011.

*Primary Examiner* — Basia Ridley
*Assistant Examiner* — Caitlin Wilmot
(74) *Attorney, Agent, or Firm* — Nelson Mullins Riley & Scarborough LLP; Anthony A. Laurentano

(57) ABSTRACT

A fuel cell unit configuring a fuel cell is provided with a first separator, a first electrolyte film/electrode body, a second separator, a second electrolyte film/electrode body, and a third separator. Resin guide members are provided on the outer periphery of the first separator, the second separator, and the third separator. The resin guide members have outer peripheral ends which protrude outwards, and in the aforementioned resin guide members are formed concave reliefs which are spaced inwards from the aforementioned outer peripheral ends.

4 Claims, 16 Drawing Sheets

FUEL CELL

RELATED APPLICATIONS

This application is a 35 U.S.C. 371 national stage filing of International Application No. PCT/JP2011/053822, filed Feb. 22, 2011, which claims priority to Japanese Patent Application No. 2010-044493 filed on Mar. 1, 2010 in Japan. The contents of the aforementioned applications are hereby incorporated by reference.

TECHNICAL FIELD

The present invention relates to a fuel cell formed by stacking a plurality of fuel cell units each including one or more membrane electrode assemblies and a plurality of separators. The membrane electrode assembly includes a pair of electrodes and an electrolyte membrane interposed between the electrodes.

BACKGROUND ART

For example, a solid polymer electrolyte fuel cell employs a membrane electrode assembly (MEA) which includes an anode, a cathode, and an electrolyte membrane interposed between the anode and the cathode. The electrolyte membrane comprises a polymer ion exchange membrane. The membrane electrode assembly is sandwiched between separators. In use, generally, a predetermined number of fuel cells are stacked together to form a fuel cell stack, which is mounted in a vehicle.

In general, several tens to hundreds of fuel cells are stacked together to form the fuel cell stack. In this regard, it is required to accurately position each of the fuel cells themselves relative to each other. For example, a fuel cell stack of this type is disclosed in Japanese Laid-Open Patent Publication No. 2009-283469.

As shown in FIG. 16, the fuel cell stack is formed by stacking a plurality of fuel cell units 1 together. Each of the fuel cell units 1 includes first and second membrane electrode assemblies 2a, 2b, and first, second, and third separators 3a, 3b, and 3c. The fuel cell units 1 are positioned together by a positioning mechanism 4. The positioning mechanism 4 includes positioning members 5. Each of the positioning members 5 is formed integrally with an end of the second separator 3b, and both ends of the positioning members 5 are engaged with the first separator 3a and the third separator 3c.

SUMMARY OF INVENTION

In the fuel cell stack, resin guides 6 are expanded on one side of the second separators 3b, each of which is positioned at the center of each fuel cell unit 1. Therefore, simply by guiding the resin guides 6 along a guide rail 7, the fuel cell units 1 can be stacked together easily and accurately.

In some cases, the fuel cell stack is placed, for example, in a casing. In such cases, it is desirable to use the resin guides 6 as shock absorbing resin members for protecting electrode surfaces of the fuel cell stack when shocks are applied to the fuel cell stack.

The present invention has been made to meet demands of this type. An object of the present invention is to provide a fuel cell having a simple and compact structure in which shock absorbing performance of the fuel cell is improved effectively, and wherein desired positioning performance is achieved.

The present invention relates to a fuel cell formed by stacking a plurality of fuel cell units each including one or more membrane electrode assemblies and a plurality of separators. The membrane electrode assembly includes a pair of electrodes and an electrolyte membrane interposed between the electrodes.

In the fuel cell, resin guide members are provided at outer circumferential portions of the separators, or at outer circumferential portions of the membrane electrode assemblies, at the same position in the stacking direction. The resin guide members provided in all but one of the separators of the fuel cell unit or the resin guide members provided in all but one of the membrane electrode assemblies of the fuel cell unit have recessed portions, which are spaced inwardly from outer ends of the resin guide members.

In the present invention, the outer end of the resin guide member, which is provided in one separator or in one membrane electrode assembly, is exposed to the outside through the recessed portion in the outer ends of the resin guide members of all of the other separators or all of the other membrane electrode assemblies. In this structure, positioning operations can be performed for each of the fuel cell units by the outer end that is exposed to the outside. Thus, desired performance in positioning of the fuel cell unit can be achieved.

Further, in the separators or in the membrane electrode assemblies of the fuel cell unit, the outer ends of the resin guide members are overlapped in the stacking direction in portions thereof excluding the recessed portion. Thus, the resin guide members can function as shock absorbers, and the amount of weight and shocks that can be supported is increased effectively. Thus, with a simple structure, shock resistance of the fuel cell is improved effectively, and desired performance in positioning of the fuel cell can be achieved.

DESCRIPTION OF EMBODIMENTS

Figure 1:
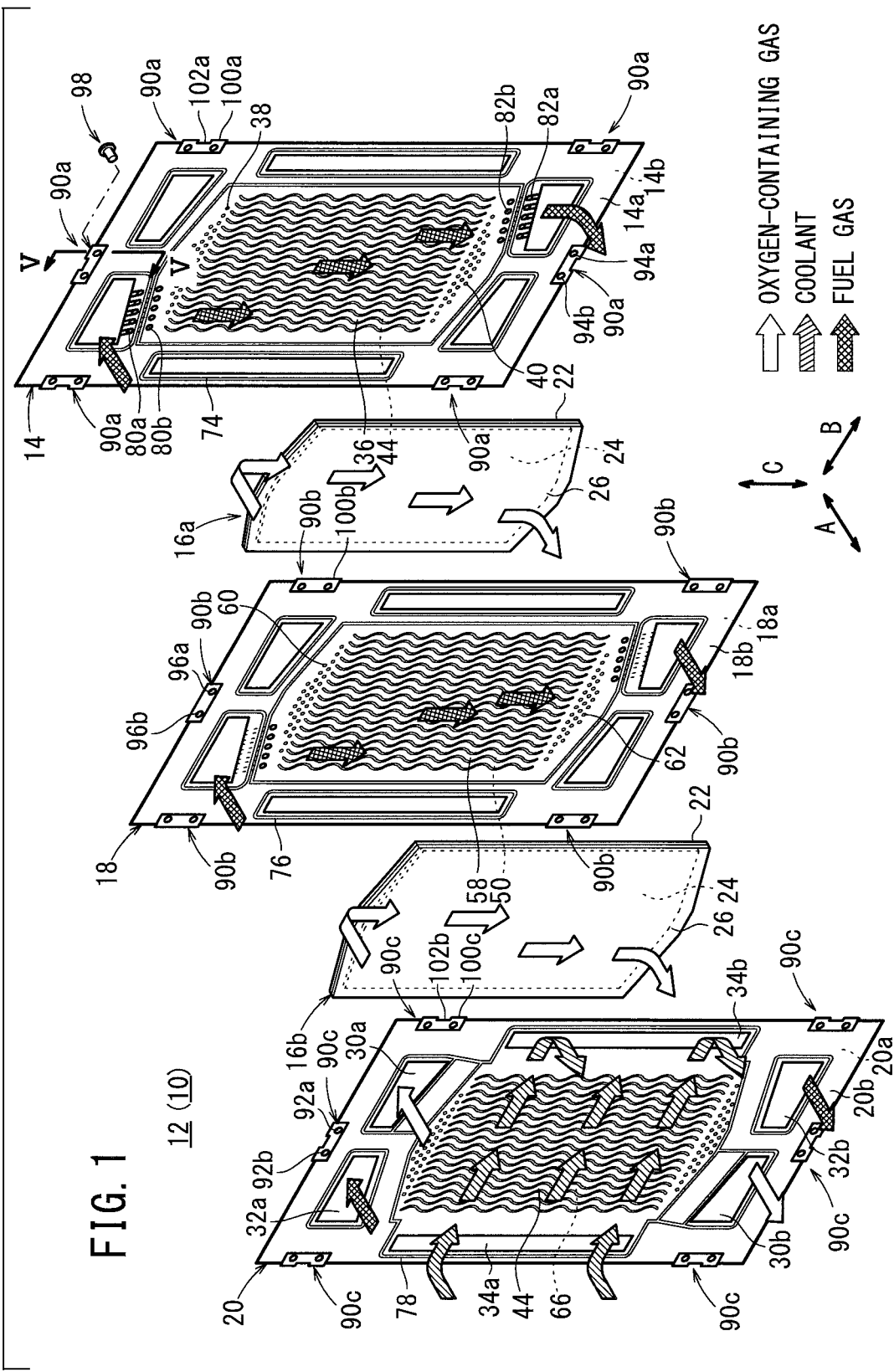
FIG. 1 is an exploded perspective view of a fuel cell unit of a fuel cell according to a first embodiment of the present invention.

As shown in FIG. 1, a fuel cell 10 according to a first embodiment of the present invention is formed by stacking a plurality of fuel cell units 12 in a horizontal direction, as indicated by the arrow A, or in the direction of gravity, as indicated by the arrow C. Each of the fuel cell units 12 includes a first separator 14, a first membrane electrode assembly (MEA) 16a, a second separator 18, a second membrane electrode assembly 16b, and a third separator 20.

For example, the first separator 14, the second separator 18, and the third separator 20 are metal plates such as steel plates, stainless steel plates, aluminum plates, plated steel sheets, or metal plates having anti-corrosive surfaces formed by application of surface treatment thereto. The first separator 14, the second separator 18, and the third separator 20 have ridges and grooves in cross section, which are formed by corrugating metal thin plates under pressure. Instead of metal separators, for example, carbon separators may be used as the first separator 14, the second separator 18, and the third separator 20.

The surface area of the first membrane electrode assembly 16a is smaller than the surface area of the second membrane electrode assembly 16b. Each of the first and second membrane electrode assemblies 16a, 16b includes an anode 24, a cathode 26, and a solid polymer electrolyte membrane 22 interposed between the anode 24 and the cathode 26. The solid polymer electrolyte membrane 22 is formed by impregnating a thin membrane of perfluorosulfonic acid with water, for example.

The surface area of the anode 24 is smaller than the surface area of the cathode 26. The surface areas of the anode 24 and the cathode 26 are reduced by forming cutouts at upper and lower positions at both ends in the direction indicated by the arrow B, respectively.

Each of the anode 24 and the cathode 26 has a gas diffusion layer (not shown) such as carbon paper, and an electrode catalyst layer (not shown) of platinum alloy supported on porous particles. The carbon particles are deposited uniformly on the surface of the gas diffusion layer. The electrode catalyst layer of the anode 24 and the electrode catalyst layer of the cathode 26 are fixed to both surfaces of the solid polymer electrolyte membrane 22, respectively.

At an upper end of the fuel cell unit 12 in the longitudinal direction indicated by the arrow C, an oxygen-containing gas supply passage 30a for supplying an oxygen-containing gas, and a fuel gas supply passage 32a for supplying a fuel gas such as a hydrogen-containing gas are provided. The oxygen-containing gas supply passage 30a and the fuel gas supply passage 32a extend through the fuel cell unit 12 in the direction indicated by the arrow A.

At a lower end of the fuel cell unit 12 in the longitudinal direction indicated by the arrow C, a fuel gas discharge passage 32b for discharging the fuel gas, and an oxygen-containing gas discharge passage 30b for discharging the oxygen-containing gas are provided. The fuel gas discharge passage 32b and the oxygen-containing gas discharge passage 30b extend through the fuel cell unit 12 in the direction indicated by the arrow A.

At one end of the fuel cell unit 12 in a lateral direction indicated by the arrow B, a coolant supply passage 34a for supplying a coolant is provided, and at the other end of the fuel cell unit 12 in the lateral direction, a coolant discharge passage 34b for discharging the coolant is provided. The coolant supply passage 34a and the coolant discharge passage 34b extend through the fuel cell unit 12 in the direction indicated by the arrow A.

Figure 2:
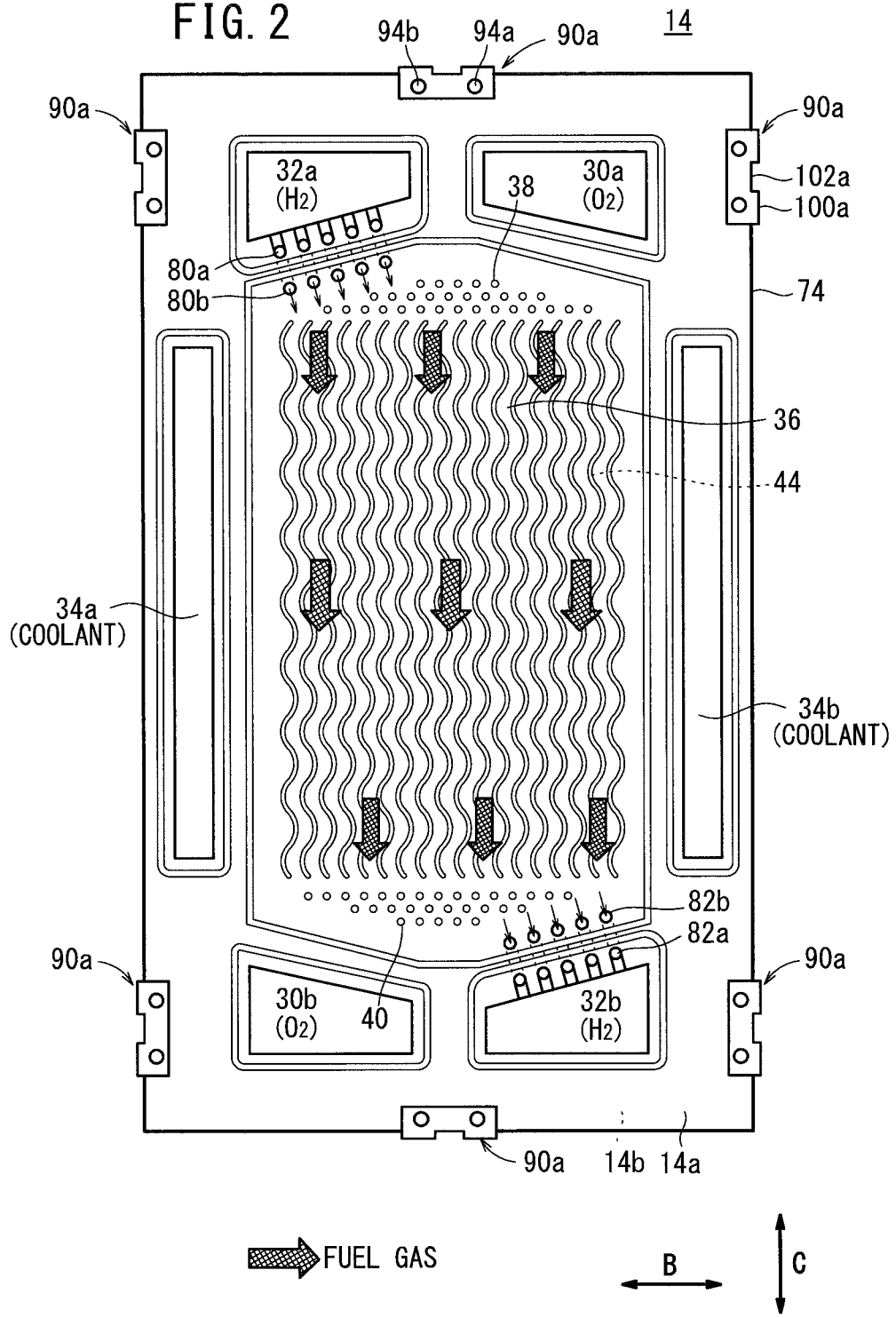
FIG. 2 is a front view showing a first separator of the fuel cell unit.

As shown in FIG. 2, the first separator 14 has a first fuel gas flow field 36 on a surface 14a thereof facing the first membrane electrode assembly 16a. The first fuel gas flow field 36 is connected to the fuel gas supply passage 32a and the fuel gas discharge passage 32b. The first fuel gas flow field 36 includes a plurality of corrugated flow grooves extending in the direction indicated by the arrow C. An inlet buffer 38 is provided adjacent to the outlet (upper end) of the first fuel gas flow field 36, and an outlet buffer 40 is provided adjacent to the inlet (lower end) of the first fuel gas flow field 36. Plural bosses are formed in the inlet buffer 38 and the outlet buffer 40, respectively.

A coolant flow field 44 is formed on a surface 14b of the first separator 14. The coolant flow field 44 is connected to the coolant supply passage 34a and the coolant discharge passage 34b. The coolant flow field 44 is formed on the back surface of the first fuel gas flow field 36.

Figure 3:
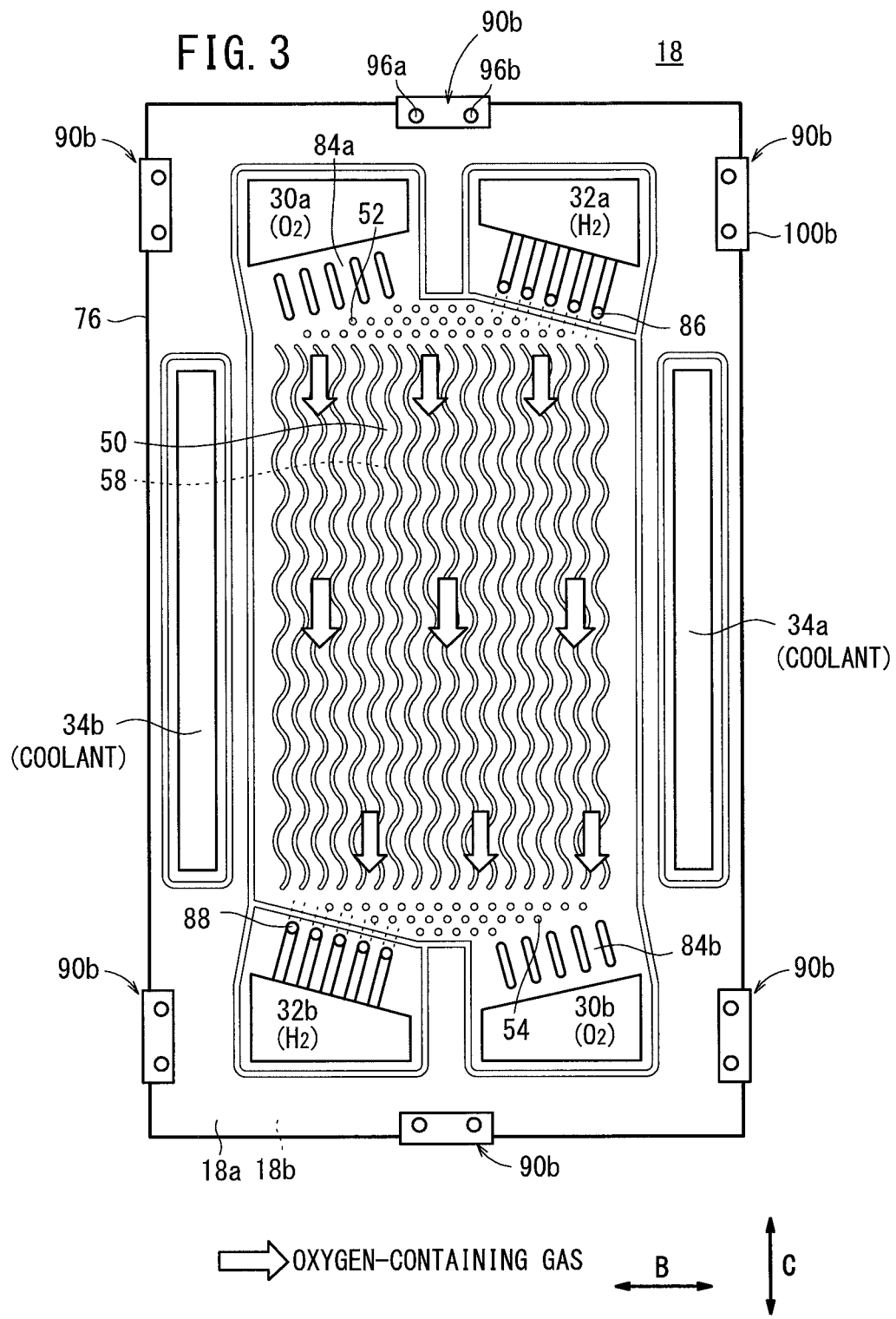
FIG. 3 is a front view showing a second separator of the fuel cell unit.

As shown in FIG. 3, the second separator 18 has a first oxygen-containing gas flow field 50 on a surface 18a thereof facing the first membrane electrode assembly 16a. The first oxygen-containing gas flow field 50 is connected to the oxygen-containing gas supply passage 30a and the oxygen-containing gas discharge passage 30b. The first oxygen-containing gas flow field 50 includes a plurality of corrugated flow grooves extending in the direction indicated by the arrow C. An inlet buffer 52 is provided adjacent to the outlet (upper end) of the first oxygen-containing gas flow field 50, and an outlet buffer 54 is provided adjacent to the inlet (lower end) of the first oxygen-containing gas flow field 50. Plural bosses are formed in the inlet buffer 52 and the outlet buffer 54, respectively.

As shown in FIG. 1, the second separator 18 has a second fuel gas flow field 58 on a surface 18a thereof facing the second membrane electrode assembly 16b. The second fuel gas flow field 58 is connected to the fuel gas supply passage 32a and the fuel gas discharge passage 32b. The second fuel gas flow field 58 includes a plurality of corrugated flow grooves extending in the direction indicated by the arrow C. An inlet buffer 60 is provided adjacent to the inlet (upper end) of the second fuel gas flow field 58, and an outlet buffer 62 is provided adjacent to the outlet (lower end) of the second fuel gas flow field 58.

Figure 4:
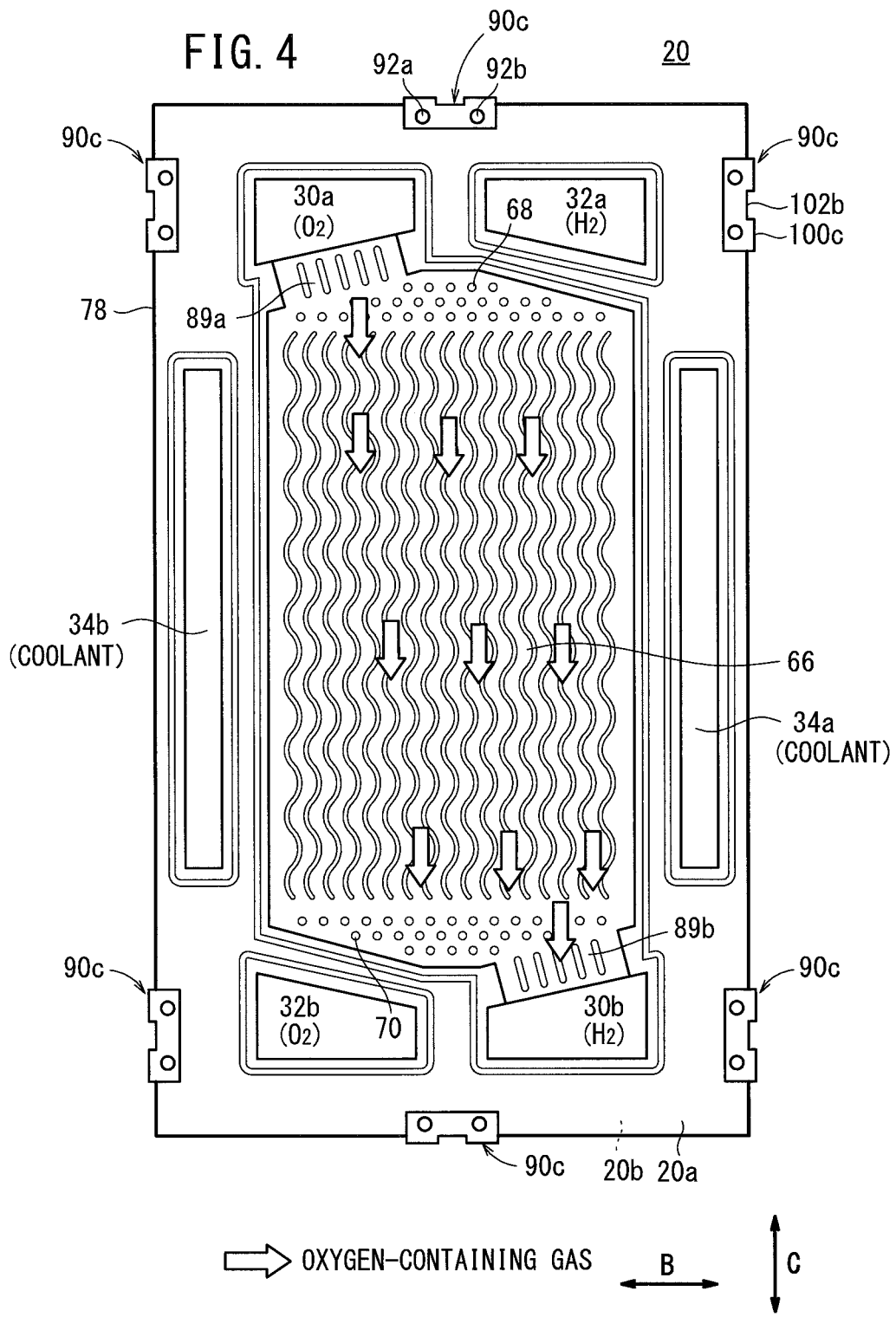
FIG. 4 is a front view showing a third separator of the fuel cell unit.

As shown in FIG. 4, the third separator 20 has a second oxygen-containing gas flow field 66 on a surface 20a thereof facing the second membrane electrode assembly 16b.

An inlet buffer 68 is provided adjacent to the inlet (upper end) of the second oxygen-containing gas flow field 66, and an outlet buffer 70 is provided adjacent to the outlet (lower end) of the second oxygen-containing gas flow field 66. Plural bosses are formed in the inlet buffer 68 and the outlet buffer 70, respectively.

As shown in FIG. 1, the coolant flow field 44 is formed on a surface 20b of the third separator 20. The coolant flow field 44 is connected to the coolant supply passage 34a and the coolant discharge passage 34b. The coolant flow field 44 is formed by stacking corrugated back surfaces of the first fuel gas flow field 36 and the second oxygen-containing gas flow field 66.

A first seal member 74 is formed integrally with the surfaces 14a, 14b of the first separator 14, around the outer circumferential end of the first separator 14. A second seal member 76 is formed integrally with the surfaces 18a, 18b of the second separator 18, around the outer circumferential end of the second separator 18. A third seal member 78 is formed integrally with surfaces 20a, 20b of the third separator 20, around the outer circumferential end of the third separator 20.

Each of the first to third seal members 74, 76, 78 is made of a sealing material, a cushion material, or a packing material such as EPDM rubber (ethylene propylene diene monomer), NBR (nitrile butadiene rubber), fluoro rubber, silicone rubber, fluorosilicone rubber, butyl rubber, natural rubber, styrene rubber, chloroprene rubber, or acrylic rubber.

As shown in FIGS. 1 and 2, a plurality of outer supply holes 80a and a plurality of inner supply holes 80b connecting the fuel gas supply passage 32a and the first fuel gas flow field 36 are formed in the first separator 14. Further, a plurality of outer discharge holes 82a and a plurality of inner discharge holes 82b, which connect the fuel gas discharge passage 32b and the first fuel gas flow field 36, are formed in the first separator 14.

As shown in FIG. 3, on the surface 18a of the second separator 18, a plurality of inlet connection channels 84a and a plurality of outlet connection channels 84b are formed in portions where the oxygen-containing gas supply passage 30a and the oxygen-containing gas discharge passage 30b are connected to the first oxygen-containing gas flow field 50. Further, a plurality of supply holes 86, which connect the fuel gas supply passage 32a and the second fuel gas flow field 58, and a plurality of discharge holes 88, which connect the fuel gas discharge passage 32b and the second fuel gas flow field 58, are formed in the second separator 18.

As shown in FIG. 4, on the surface 20a of the third separator 20, a plurality of inlet connection channels 89a and a plurality of outlet connection channels 89b are formed in portions where the oxygen-containing gas supply passage 30a and the oxygen-containing gas discharge passage 30b are connected to the second oxygen-containing gas flow field 66.

As shown in FIG. 1, a plurality of resin guide members 90a are provided on the outer circumferential end of the first separator 14, a plurality of resin guide members 90b are provided on the outer end of the second separator 18, and a plurality of resin guide members 90c are provided on the outer end of the third separator 20. Each of the resin guide members 90a, 90b, 90c, for example, is made of polyphenylene sulfide (PPS), polyacetal (POM), polybutylene terephthalate (PBT), polyetheretherketone (PEEK), liquid crystal polymer (LCP), or ABS resin.

The resin guide members 90a, 90b, and 90c are formed by fixing molded pieces, which are formed by molding insulating resin, into cutout portions provided in the metal plates of the first separator 14, the second separator 18, and the third separator 20. The resin guide members 90a, 90b, 90c may be fixed by crimping, adhesion or the like. Alternatively, the resin guide members 90a, 90b, and 90c may be formed integrally with the cutout portions of the metal plates by injection molding.

Holes 92a, 92b are formed in parallel with each other in each of the resin guide members 90c. Also, holes 94a, 94b are formed in each of the resin guide members 90a, and holes 96a, 96b are formed in each of the resin guide members 90b. The holes 94a, 94b of the resin guide member 90a and the holes 96a, 96b of the resin guide member 90b are connected to the holes 92a, 92b of the resin guide member 90c in the direction indicated by the arrow A.

Figure 5:
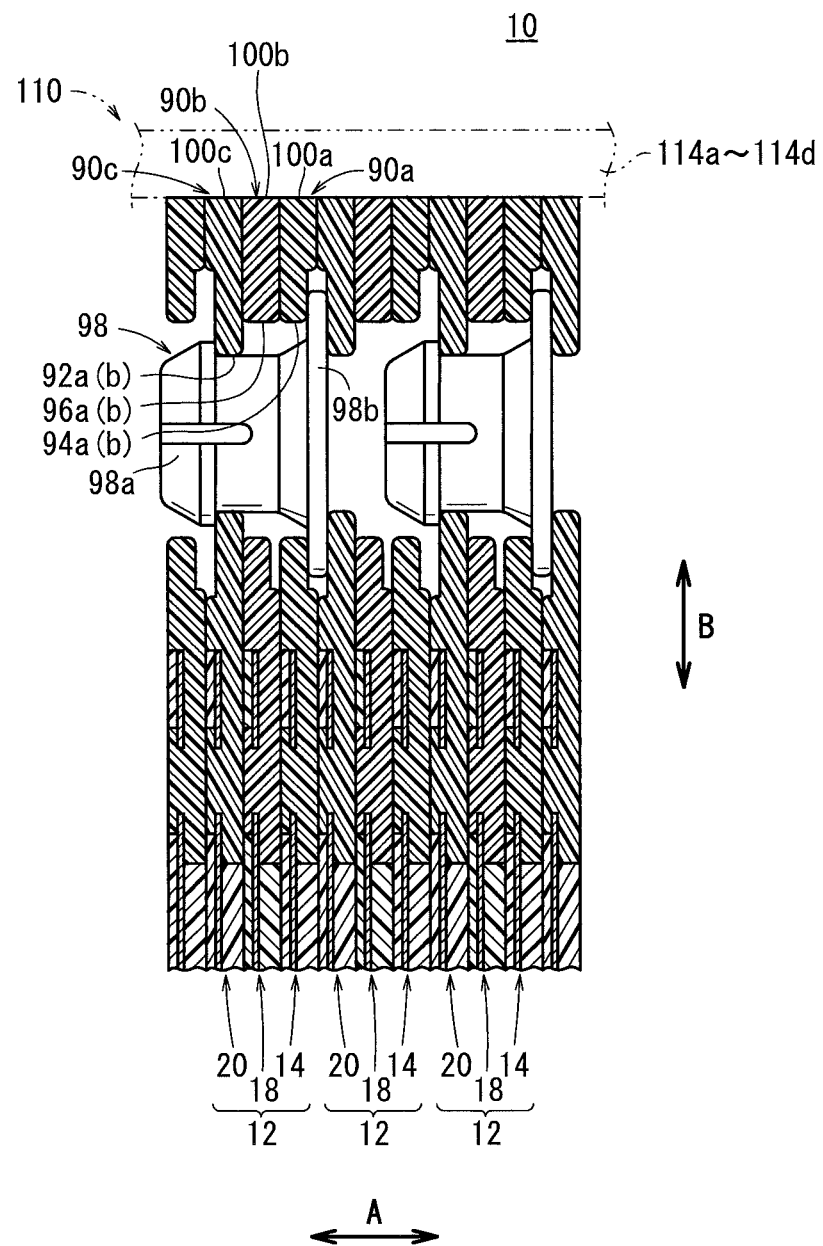
FIG. 5 is a cross sectional view of the fuel cell, taken along line V-V in FIG. 1.

As shown in FIG. 5, the diameter of the holes 92a, 92b is smaller than the diameter of the holes 94a, 94b, 96a, and 96b. In every other fuel cell unit 12 along the stacking direction, for example, a connection member such as an insulating resin clip 98 having a plurality of slits formed in radial directions is inserted into the holes 92a, 94a, 96a. In every other fuel cell unit 12 along the stacking direction except for the aforementioned fuel cell units 12, likewise, insulating resin clips 98 serving as connection members are inserted into the holes 92b, 94b, and 96b.

Each of the insulating resin clips 98 includes a neck 98a and a flange 98b having a large diameter. The neck 98a is engaged with the third separator 20, and the flange 98b contacts the first separator 14. Thus, the first separator 14, the second separator 18, and the third separator 20 are fixed together in the stacking direction.

Figure 6:
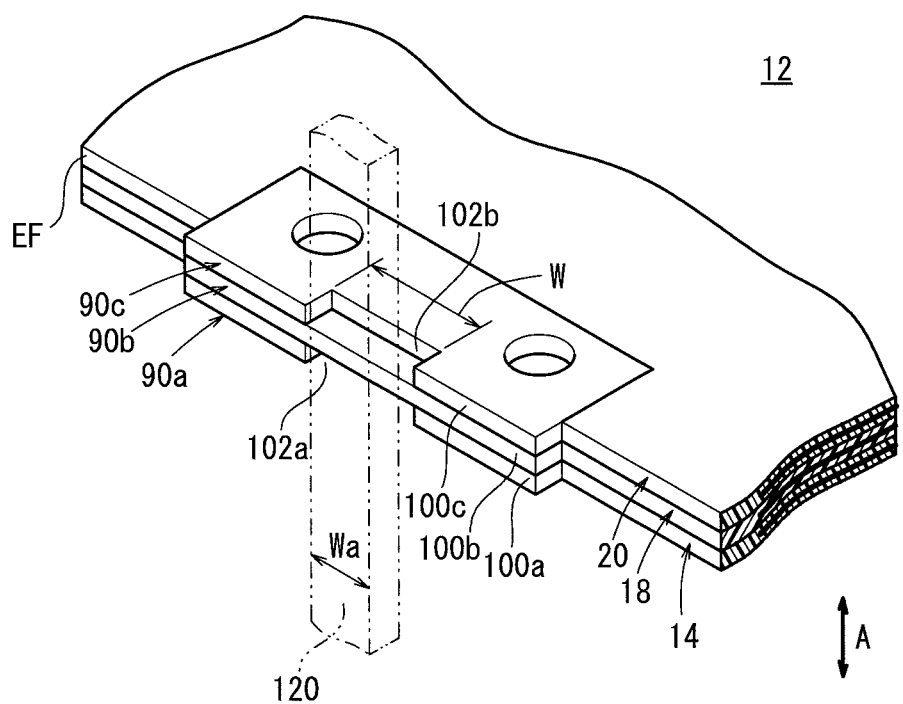
FIG. 6 is a perspective view showing resin guide members of the fuel cell unit.

As shown in FIG. 6, the resin guide members 90a, 90b, and 90c have outer ends 100a, 100b, and 100c that protrude outwardly from outer circumferential end surfaces EF of the first separator 14, the second separator 18, and the third separator 20. Among the first separator 14, the second separator 18, and the third separator 20 (i.e., among the plurality of separators), except for the second separator 18, the resin guide members 90a, 90c, which are provided in the first separator 14 and the third separator 20, have recessed portions 102a, 102b that are spaced inwardly from the outer ends 100a, 100c. Preferably, the recessed portions 102a, 102b are provided at substantially central positions of the resin guide members 90a, 90b.

Figure 7:
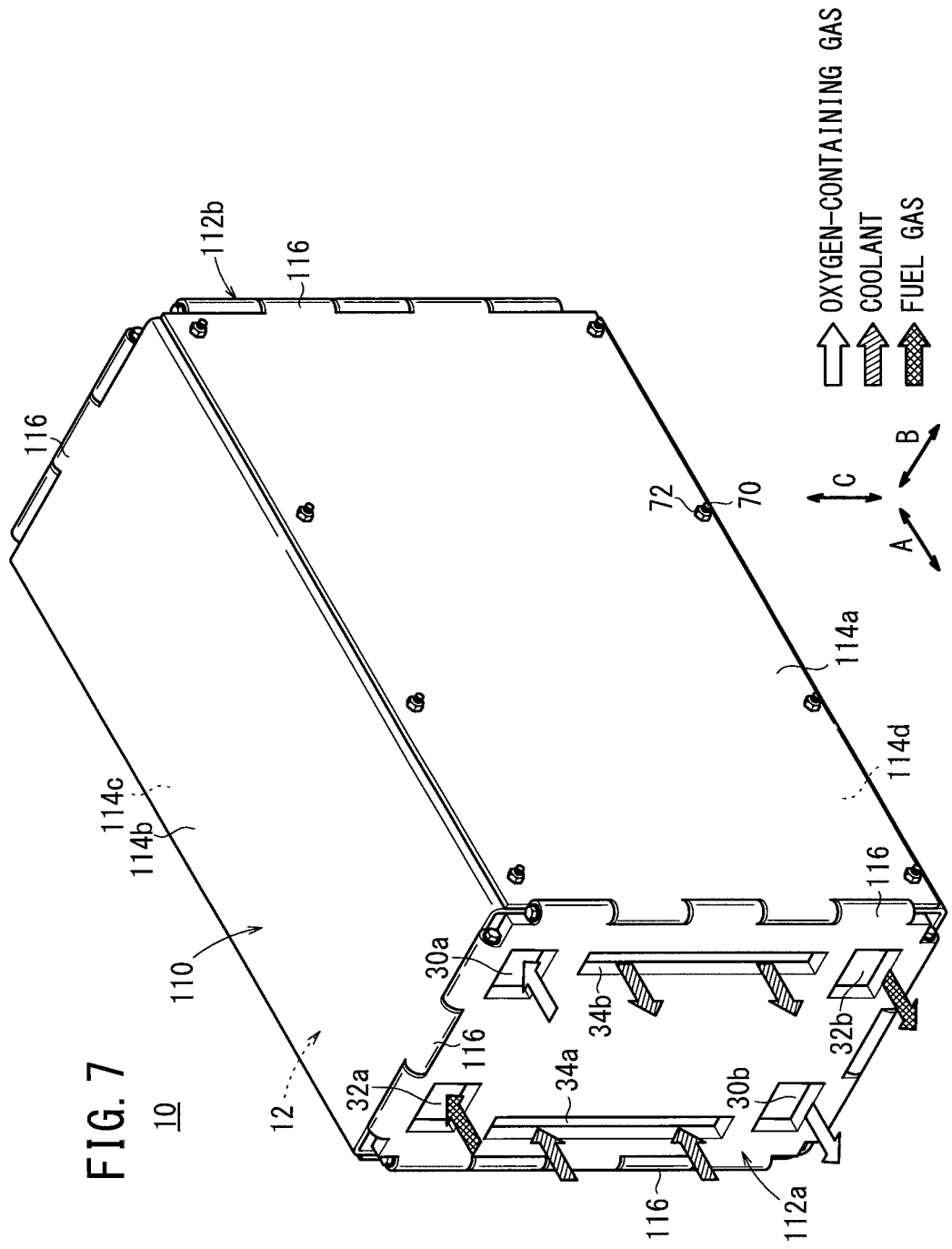
FIG. 7 is a perspective view showing a state in which the fuel cell is placed in a casing.

As shown in FIG. 7, the fuel cell 10 is placed in a casing 110. The casing 110 includes end plates 112a, 112b provided at opposite ends of the fuel cell units 12 in the stacking direction, four side panels 114a to 114d provided on sides of the fuel cell units 12, and hinge mechanisms 116 that couple the end plates 112a, 112b and the side panels 114a to 114d together. The side panels 114a to 114d are made of stainless steel (e.g., SUS 304) or another metal material. Alternatively, the side panels 114a to 114d may be made from a carbon material.

As shown in FIG. 5, in the casing 110, outer ends 100a, 100b, and 100c of the resin guide members 90a, 90b, and 90c of the first separator 14, the second separator 18, and the third separator 20 of each fuel cell unit 12 can come into contact with the inner surface of the casing 110 (i.e., inner surfaces of the side panels 114a to 114d). Instead of the casing 110, a bar (not shown) may be provided that extends across the end plates 112a, 112b. In this case, the outer ends 100a, 100b, and 100c of the resin guide members 90a, 90b, and 90c come into contact with the inner surface of the bar.

Operations of the fuel cell 10 will be described below.

First, as shown in FIG. 1, an oxygen-containing gas is supplied to the oxygen-containing gas supply passage 30a, and a fuel gas such as a hydrogen-containing gas is supplied to the fuel gas supply passage 32a. Further, pure water, ethylene glycol, or oil is supplied to the coolant supply passage 34a.

Thus, the oxygen-containing gas flows from the oxygen-containing gas supply passage 30a to the first oxygen-containing gas flow field 50 of the second separator 18 and the second oxygen-containing gas flow field 66 of the third separator (see FIGS. 3 and 4). The oxygen-containing gas flows along the first oxygen-containing gas flow field 50 in the direction of gravity, as indicated by the arrow C, and the oxygen-containing gas is supplied to the cathode 26 of the first membrane electrode assembly 16a. Further, the oxygen-containing gas also flows along the second oxygen-containing gas flow field 66 in the direction indicated by the arrow C, and the oxygen-containing gas is supplied to the cathode 26 of the second membrane electrode assembly 16b (see FIG. 1).

As shown in FIGS. 1 and 2, the fuel gas from the fuel gas supply passage 32a flows through the outer supply holes 80a toward the surface 14b of the first separator 14. Further, the fuel gas flows from the inner supply holes 80*b* toward the surface 14*a*. Thus, as shown in FIG. 2, the fuel gas is supplied to the inlet buffer 38. Then, the fuel gas moves along the first fuel gas flow field 36 in the direction of gravity, as indicated by the arrow C, and the fuel gas is supplied to the anode 24 of the first membrane electrode assembly 16*a*.

Further, as shown in FIG. 3, the fuel gas flows through the supply holes 86 and moves toward the surface 18*b* of the second separator 18. Thus, as shown in FIG. 1, the fuel gas is supplied to the inlet buffer 60 on the surface 18*b*. Then, the fuel gas moves along the second fuel gas flow field 58 in the direction indicated by the arrow C, and the fuel gas is supplied to the anode 24 of the second membrane electrode assembly 16*b*.

Thus, in each of the first and second membrane electrode assemblies 16*a*, 16*b*, the oxygen-containing gas, which is supplied to the cathode 26, and the fuel gas, which is supplied to the anode 24, are consumed in electrochemical reactions that take place at electrode catalyst layers of the cathode 26 and the anode 24 for thereby generating electricity.

Then, the oxygen-containing gas, which is consumed at the cathodes 26 of the first and second membrane electrode assemblies 16*a*, 16*b*, is discharged along the oxygen-containing gas discharge passage 30*b* in the direction indicated by the arrow A.

As shown in FIG. 2, the fuel gas, which is consumed at the anode 24 of the first membrane electrode assembly 16*a*, flows from the outlet buffer 40 through the inner discharge holes 82*b* toward the surface 14*b* of the first separator 14. As shown in FIG. 1, after the fuel gas has been supplied to the surface 14*b*, the fuel gas flows into the outer discharge holes 82*a*, whereupon the fuel gas moves again toward the surface 14*a*. Thus, as shown in FIG. 2, the fuel gas is discharged from the outer discharge holes 82*a* into the fuel gas discharge passage 32*b*.

Further, the fuel gas, which is consumed at the anode 24 of the second membrane electrode assembly 16*b*, flows from the outlet buffer 62 through the discharge holes 88 toward the surface 18*a*. As shown in FIG. 3, the fuel gas is discharged into the fuel gas discharge passage 32*b*.

As shown in FIG. 1, the coolant that is supplied to the coolant supply passage 34*a* flows into the coolant flow field 44 formed between the first separator 14 and the third separator 20, and then, the coolant flows in the direction indicated by the arrow B. After the coolant has cooled the first and second membrane electrode assemblies 16*a*, 16*b*, the coolant is discharged into the coolant discharge passage 34*b*.

In the first embodiment, in a predetermined number of fuel cell units 12, the insulating resin clips 98 are inserted into the holes 94*a*, 96*a*, and 92*a* of the resin guide members 90*a*, 90*b*, and 90*c*. In another predetermined number of fuel cell units 12, the insulating resin clips 98 are inserted into the holes 94*b*, 96*b*, and 92*b*. Then, as shown in FIG. 6, in the fuel cell units 12 which have been assembled together, only the outer end 100*b* of the resin guide member 90*b* of the second separator 18 is exposed to the outside at the center thereof. This is because the inwardly spaced recessed portions 102*a*, 102*b* are formed in the outer ends 100*a*, 100*c* of the resin guide members 90*a*, 90*c* sandwiching the resin guide member 90*b* therebetween. The width of the recessed portions 102*a*, 102*b* is larger than the width Wa of the guide rail 120.

In this structure, simply by guiding the outer end 100*b* of the resin guide member 90*b* of each of the fuel cell units 12 along the guide rail 120, the fuel cell units 12 can be stacked together easily and accurately.

Further, according to the first embodiment, in the first separator 14, the second separator 18, and the third separator 20 of the fuel cell unit 12, the outer ends 100*a*, 100*b*, and 100*c* of the resin guide members 90*a*, 90*b*, and 90*c* are overlapped in the stacking direction, in portions thereof excluding the recessed portions 102*a* and 102*b* (i.e., on both sides of the recessed portions 102*a*, 102*b*).

Thus, as shown in FIG. 5, the resin guide members 90*a*, 90*b*, and 90*c* all come into contact together with the inner surface of the casing 110. In this structure, the resin guide members 90*a*, 90*b*, and 90*c* are capable of functioning as shock absorbers, such that the weight and shocks that can be supported are increased effectively. With such a simple structure, shock resistance of the fuel cell 10 is improved effectively, and a desired performance in positioning of the fuel cell 10 can be achieved.

Figure 8:
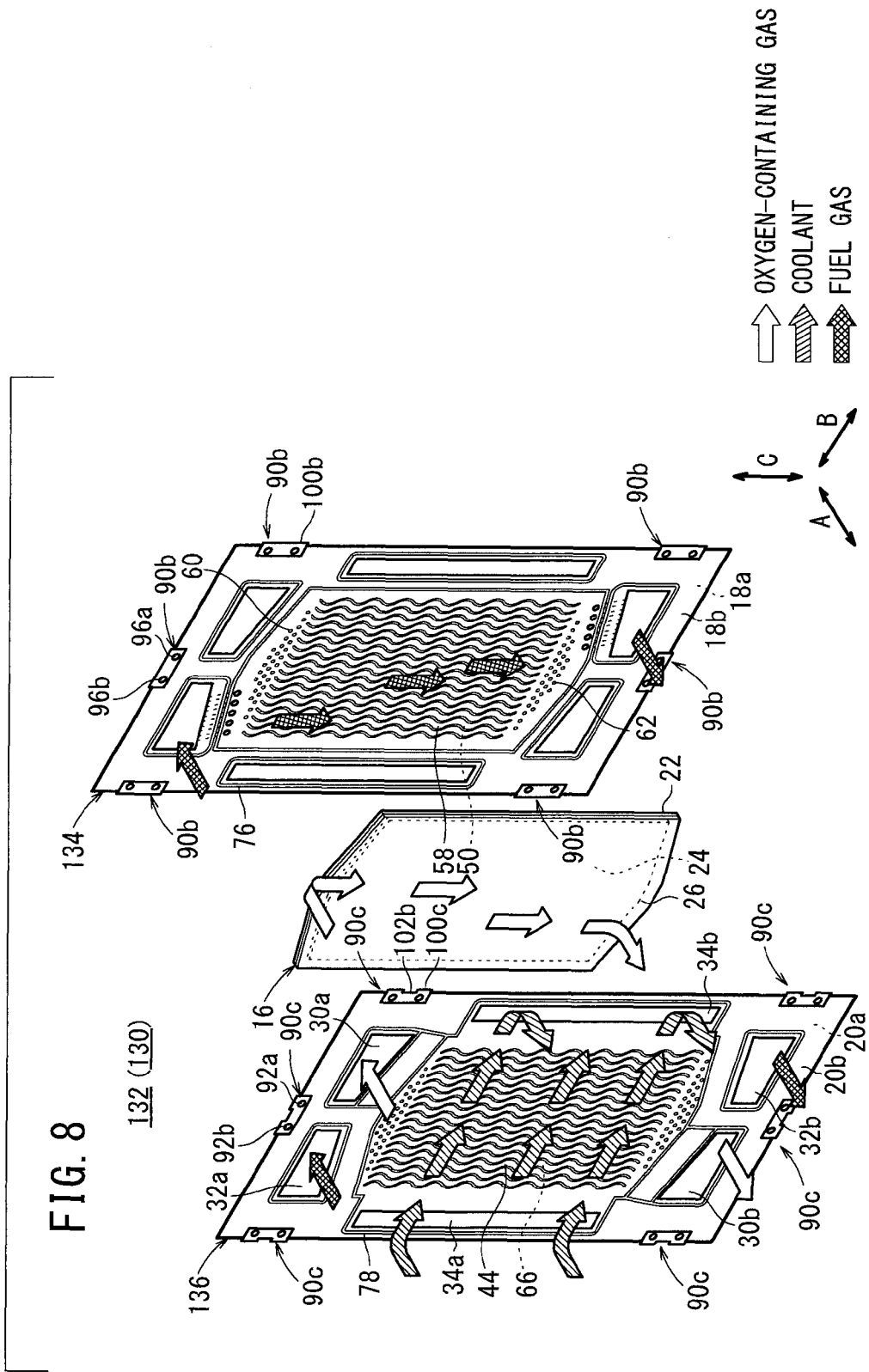
FIG. 8 is an exploded perspective view showing a fuel cell unit of a fuel cell according to a second embodiment of the present invention.

FIG. 8 is an exploded perspective view showing a fuel cell unit 132 of a fuel cell 130 according to a second embodiment of the present invention.

Constituent elements, which are identical to those of the fuel cell 10 according to the first embodiment, are designated with the same reference numerals, and descriptions of such features are omitted. Also, in a third embodiment to be described later, constituent elements thereof, which are identical to those of the fuel cell 10 according to the first embodiment, are designated with the same reference numerals, and descriptions of such features are omitted.

The fuel cell unit 132 includes a first separator 134, a membrane electrode assembly 16, and a second separator 136. Plural resin guide members 90*b*, 90*c* are provided on outer circumferential ends of the first separator 134 and the second separator 136, respectively. The resin guide members 90*b*, 90*c* have outer ends 100*b*, 100*c* that protrude outwardly. In addition, recessed portions 102*b* are formed in each of the outer ends 100*c* of the resin guide members 90*c*.

In the second embodiment, after the fuel cell units 132 have been assembled together, only the outer ends 100*b* of the resin guide members 90*b*, which are provided in each of the first separators 134, are used as positioning references for mutually positioning the fuel cell units 132.

The outer ends 100*b*, 100*c*, excluding the recessed portions 102*b* of the resin guide members 90*b*, 90*c* provided in the first separator 134 and the second separator 136, are located at the same position in the stacking direction and are overlapped with each other. Thus, the resin guide members 90*b*, 90*c* are capable of functioning as shock absorbers. With such a simple structure, the same advantages as those of the first embodiment can be obtained. For example, the shock absorbing performance of the fuel cell 130 is improved effectively, and a desired positioning performance can be achieved.

Figure 9:
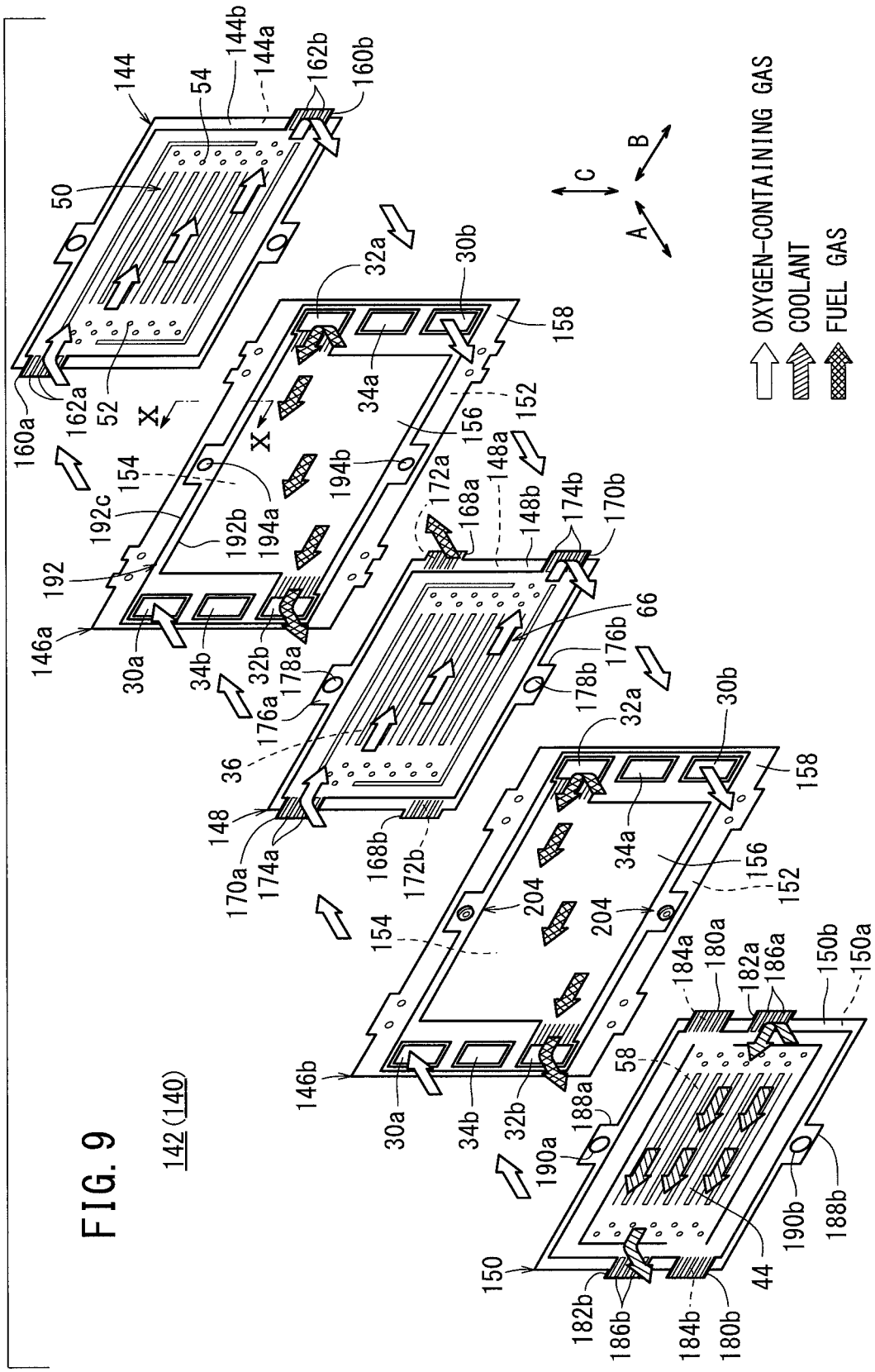
FIG. 9 is an exploded perspective view showing a fuel cell according to a third embodiment of the present invention.

FIG. 9 is an exploded perspective view showing main components of a fuel cell unit 142 of a fuel cell 140 according to a third embodiment of the present invention.

The fuel cell unit 142 includes a first separator 144, a first membrane electrode assembly (MEA) 146*a*, a second separator 148, a second membrane electrode assembly 146*b*, and a third separator 150. Each of the first membrane electrode assembly 146*a* and the second membrane electrode assembly 146*b* includes a cathode 154, an anode 156, and a solid polymer electrolyte membrane 152 interposed between the cathode 154 and the anode 156. The solid polymer electrolyte membrane 152 is formed by impregnating a thin membrane of perfluorosulfonic acid with water, for example (see FIG. 10).

The surface area of the solid polymer electrolyte membrane 152 is larger than the surface area of the cathode 154 and the surface area of the anode 156. A resin frame (outer circumferential resin frame) 158 is formed, e.g., by injection molding, integrally with the outer circumferential end of the solid polymer electrolyte membrane 152. As the resin material, for example, in addition to a general purpose plastic, engineering plastic, super engineering plastic or the like may be adopted.

As shown in FIG. 9, at one end of the frame 158 in the direction indicated by the arrow B, an oxygen-containing gas supply passage 30a, a coolant discharge passage 34b, and a fuel gas discharge passage 32b are arranged in the vertical direction, as indicated by the arrow C. At the other end of the frame 158 in the direction indicated by the arrow B, a fuel gas supply passage 32a, a coolant supply passage 34a, and an oxygen-containing gas discharge passage 30b are arranged in the direction indicated by the arrow C.

Outer circumferential ends of the first separator 144, the second separator 148, and the third separator 150 are positioned respectively inside the oxygen-containing gas supply passage 30a, the coolant supply passage 34a, the fuel gas discharge passage 32b, the fuel gas supply passage 32a, the coolant discharge passage 34b, and the oxygen-containing gas discharge passage 30b (hereinafter also simply referred to as "fluid passages").

Figure 11:
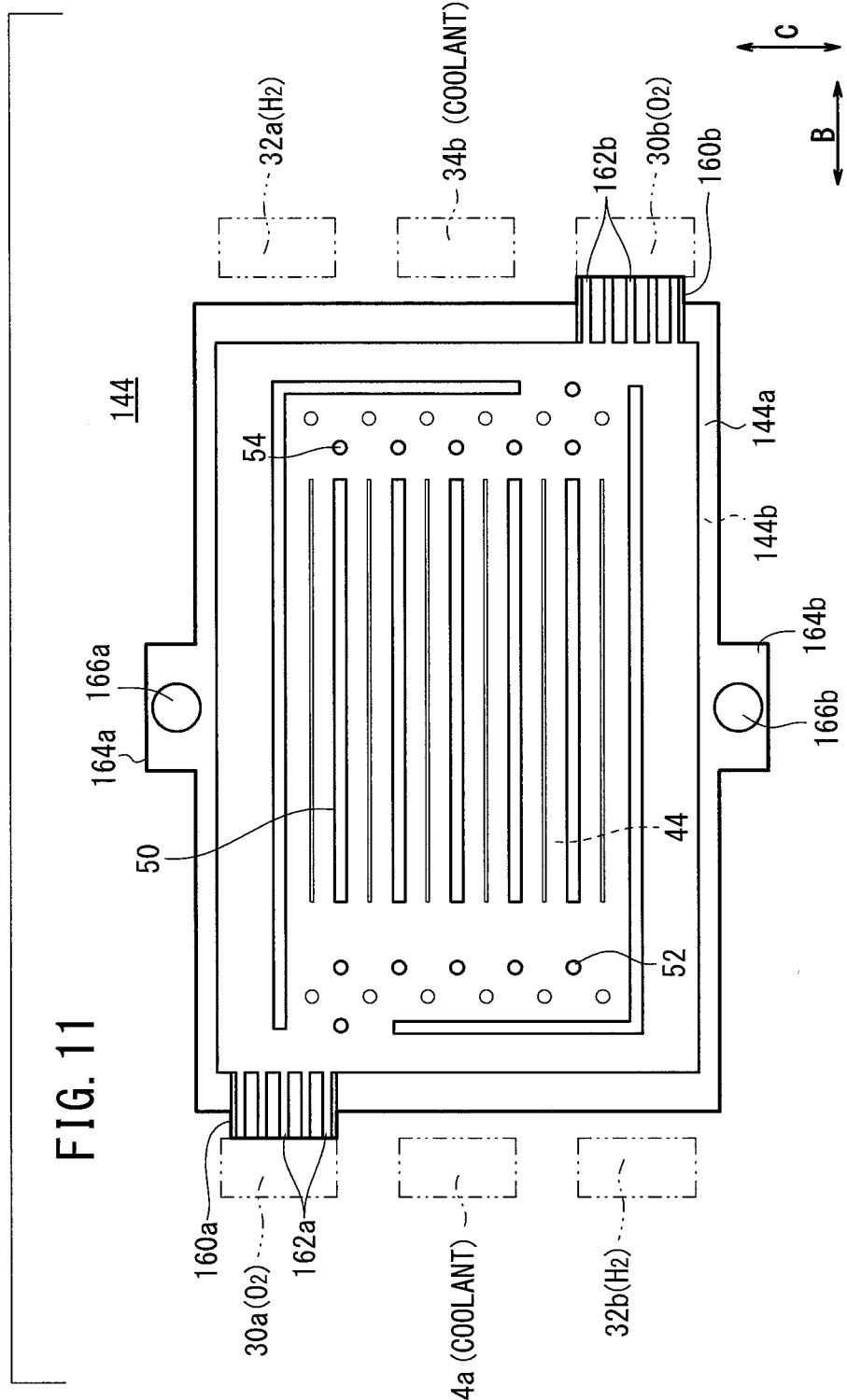
FIG. 11 is a front view showing a first separator of the fuel cell.

As shown in FIGS. 9 and 11, at both ends of the first separator 144 in the direction indicated by the arrow B, extensions 160a, 160b are provided, which protrude toward the oxygen-containing gas supply passage 30a and the oxygen-containing gas discharge passage 30b. Corrugated inlet channels 162a are formed in the extension 160a. The inlet channels 162a interconnect the oxygen-containing gas supply passage 30a and the first oxygen-containing gas flow field 50. Corrugated outlet channels 162b are formed in the extension 160b. The outlet channels 162b interconnect the oxygen-containing gas discharge passage 30b and the first oxygen-containing gas flow field 50.

Extensions 164a, 164b that protrude outwardly are formed at central positions at both ends of the first separator 144 in the direction indicated by the arrow C. Knock holes 166a, 166b extend through the extensions 164a, 164b.

As shown in FIG. 9, at both ends of the second separator 148 in the direction indicated by the arrow B, extensions 168a, 168b are provided, which protrude toward the fuel gas supply passage 32a and the fuel gas discharge passage 32b, and extensions 170a, 170b are provided, which protrude toward the oxygen-containing gas supply passage 30a and the oxygen-containing gas discharge passage 30b.

Corrugated inlet channels 172a are formed in the extension 168a on the surface 148a of the second separator 148. The inlet channels 172a interconnect the fuel gas supply passage 32a and the first fuel gas flow field 36. Corrugated outlet channels 172b are formed in the extension 168b. The outlet channels 172b interconnect the fuel gas discharge passage 32b and the first fuel gas flow field 36.

Corrugated inlet channels 174a are formed in the extension 170a on the surface 148b of the second separator 148. The inlet channels 174a interconnect the oxygen-containing gas supply passage 30a and the second oxygen-containing gas flow field 66. Corrugated outlet channels 174b are formed in the extension 170b. The outlet channels 174b interconnect the oxygen-containing gas discharge passage 30b and the second oxygen-containing gas flow field 66.

Outwardly protruding extensions 176a, 176b are formed at central positions on both ends of the second separator 148 in the direction indicated by the arrow C. Knock holes 178a, 178b extend through the extensions 176a, 176b.

At both ends of the third separator 150 in the direction indicated by the arrow B, extensions 180a, 180b are provided that protrude toward the fuel gas supply passage 32a and the fuel gas discharge passage 32b, and extensions 182a, 182b are provided that protrude toward the coolant supply passage 34a and the coolant discharge passage 34b.

Corrugated inlet channels 184a are formed in the extension 180a. The inlet channels 184a interconnect the fuel gas supply passage 32a and the second fuel gas flow field 58 on the side of the surface 150a. Corrugated outlet channels 184b are formed in the extension 180b. The outlet channels 184b interconnect the fuel gas discharge passage 32b and the second fuel gas flow field 58. Corrugated inlet channels 186a are formed in the extension 182a. The inlet channels 186a interconnect the coolant supply passage 34a and the coolant flow field 44 on the side of the surface 150b. Corrugated outlet channels 186b are formed in the extension 182b. The outlet channels 186b interconnect the coolant discharge passage 34b and the coolant flow field 44.

Outwardly protruding extensions 188a, 188b are formed at central positions on both ends of the third separator 150 in the direction indicated by the arrow C. Knock holes 190a, 190b extend through the extensions 188a, 188b.

Figure 10:
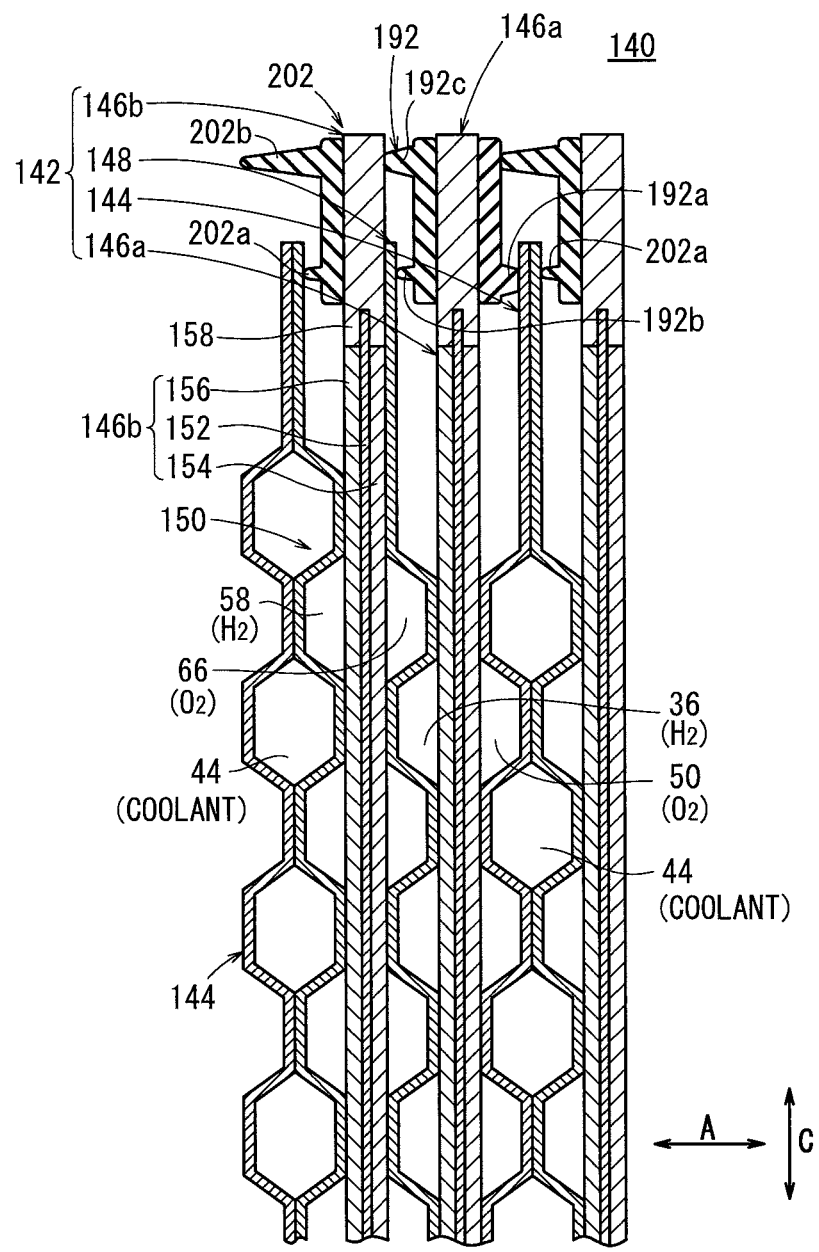
FIG. 10 is a cross sectional view of the fuel cell, taken along line X-X in FIG. 9.

A seal member 192 is formed integrally with the frame 158 of the first membrane electrode assembly 146a. As shown in FIG. 10, the seal member 192 has a first seal 192a on a surface thereof adjacent to the first separator 144. The first seal 192a is formed around and slidably contacts the outer circumferential end of the first separator 144.

Figure 12:
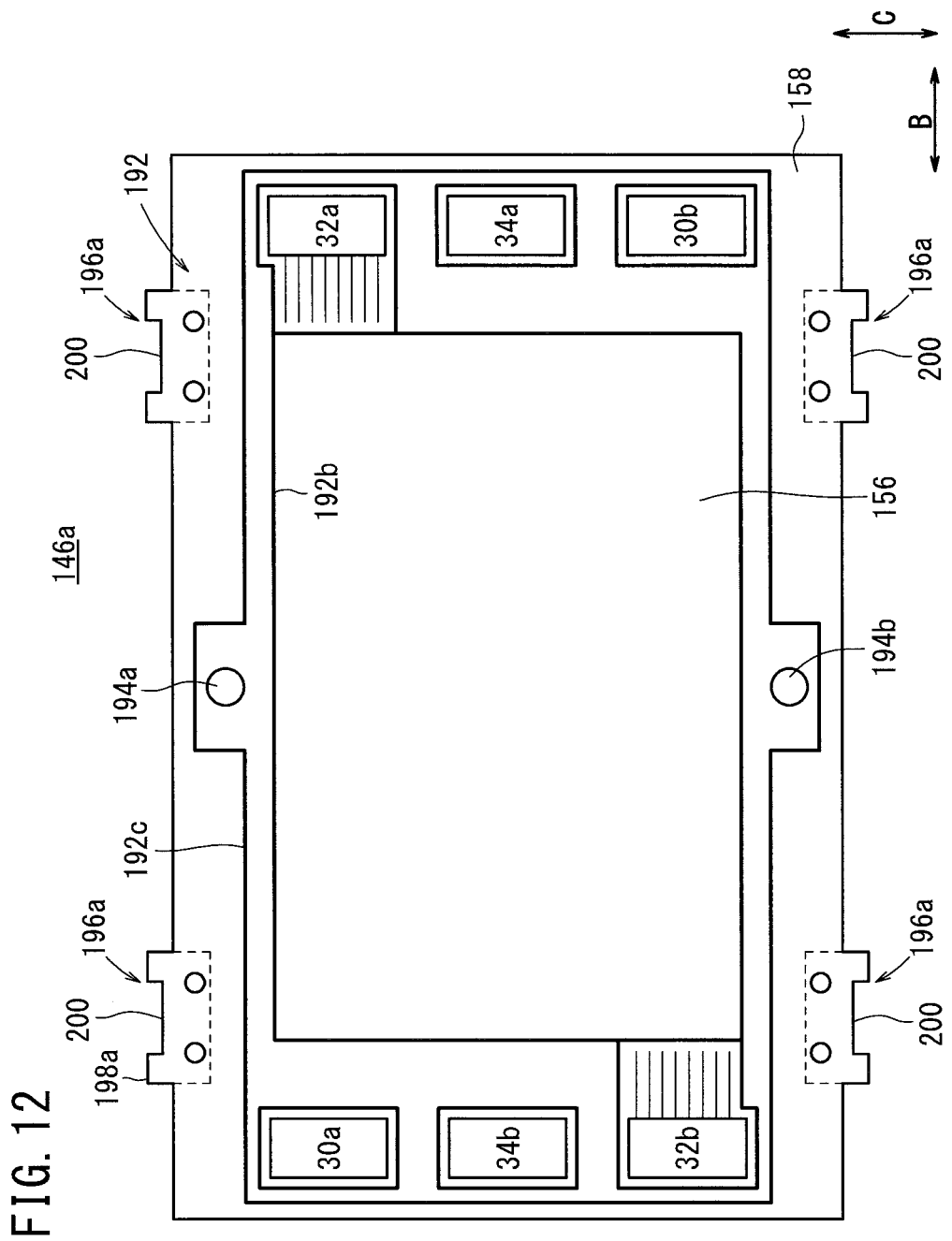
FIG. 12 is a front view showing a first membrane electrode assembly of the fuel cell.

As shown in FIGS. 10 and 12, the seal member 192 has a second seal 192b and a third seal 192c on a surface thereof adjacent to the second separator 148. The second seal 192b is formed along and slidably contacts the outer circumferential end of the second separator 148. The third seal 192c is formed on the outer side of the outer circumference of the second separator 148, and slidably contacts the frame 158 of the adjacent second membrane electrode assembly 146b.

As shown in FIG. 12, the third seal 192c includes portions that bypass the central positions, and which extend to the outside at both ends of the first membrane electrode assembly 146a in the direction indicated by the arrow C. The third seal 192c also includes knock holes 194a, 194b that extend through the seal member 192 between the bypassing portions of the third seal 192c and the second seal 192b.

Resin guide members 196a are formed integrally with the frame 158 on both sides of the knock holes 194a, 194b, in each of long sides of the first membrane electrode assembly 146a. The resin guide members 196a may be provided separately from the frame 158. Recessed portions 200 are formed in the resin guide members 196a. The recessed portions 200 are spaced inwardly from the outer ends 198a of the resin guide members 196a.

Figure 13:
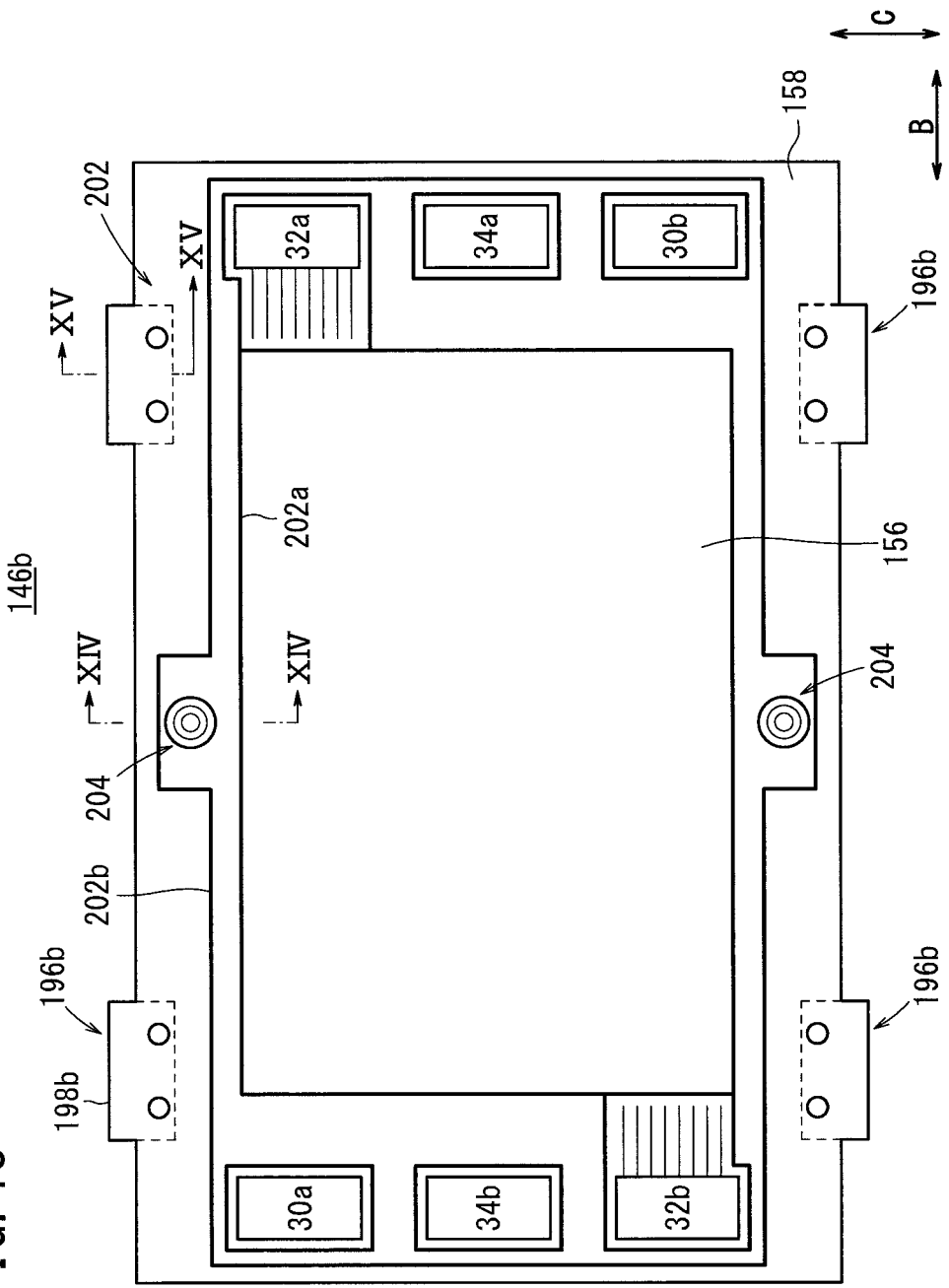
FIG. 13 is a front view showing a second membrane electrode assembly of the fuel cell.

As shown in FIGS. 10 and 13, a second seal member 202 is formed integrally with the frame 158 of the second membrane electrode assembly 146b. The second seal member 202 includes a first seal 202a and a second seal 202b on a surface thereof adjacent to the third separator 150. The first seal 202a is formed along and slidably contacts the outer circumferential end of the third separator 150. The second seal 202b is formed on the outer side of the outer circumference of the third separator 150, and slidably contacts the frame 158 of the adjacent first membrane electrode assembly 146a.

As shown in FIG. 13, the second seal 202b includes portions that bypass the central positions, and which extend to the outside at both ends in the direction indicated by the arrow C. The second seal 202b also includes knock members 204, which are formed integrally with the frame 158 between the bypassing portions of the second seal 202b and the first seal 202a.

Figure 14:
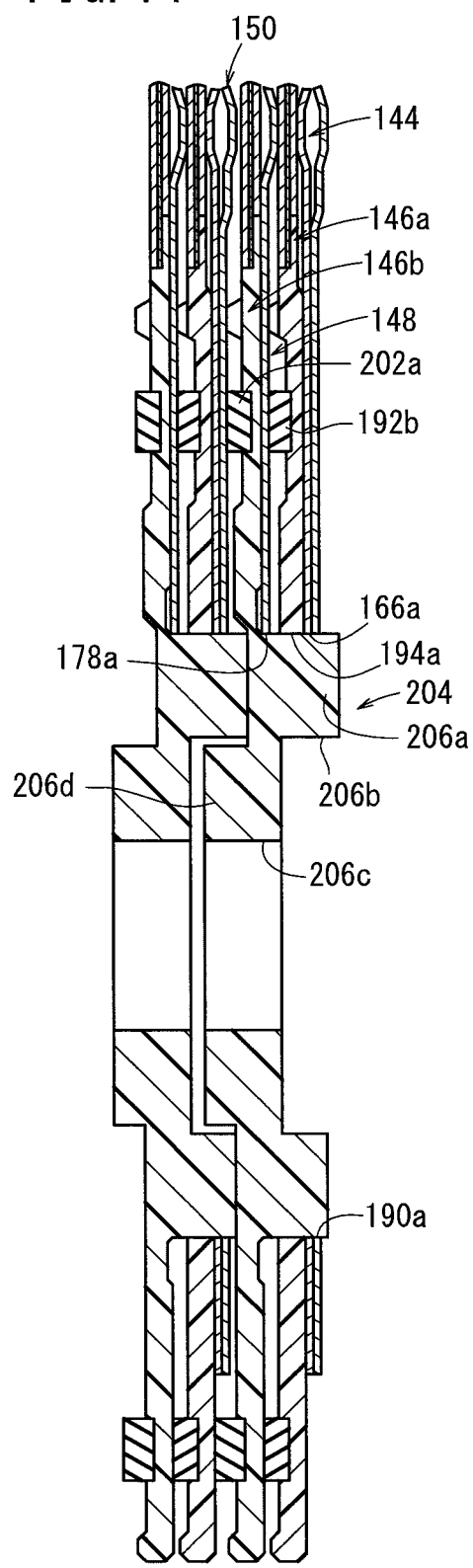
FIG. 14 is a cross sectional view of the fuel cell, taken along line XIV-XIV in FIG. 13.

As shown in FIG. 14, each of the knock members 204 includes an outer expansion 206a, which is expanded toward the second separator 148. The outer expansion 206a is inserted into a knock hole 178a of the second separator 148, a knock hole 194a of the first membrane electrode assembly 146a, and a knock hole 166a of the first separator 144. A hole 206c is formed on the inner side of the outer expansion 206a through a step 206b.

The knock member 204 includes an inner expansion 206d, which expands oppositely to the outer expansion 206a. The inner expansion 206d is positioned at the step 206b of the knock member 204 of the adjacent second membrane electrode assembly 146b.

Figure 15:
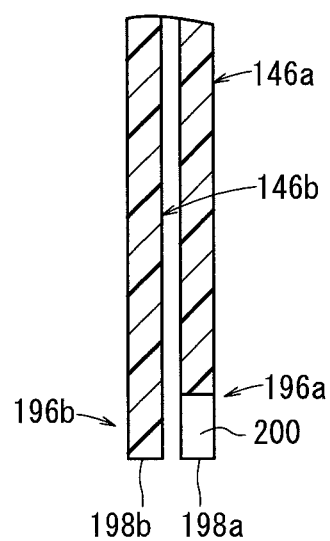
FIG. 15 is a cross sectional view of the fuel cell, taken along line XV-XV in FIG. 13.
Figure 16:
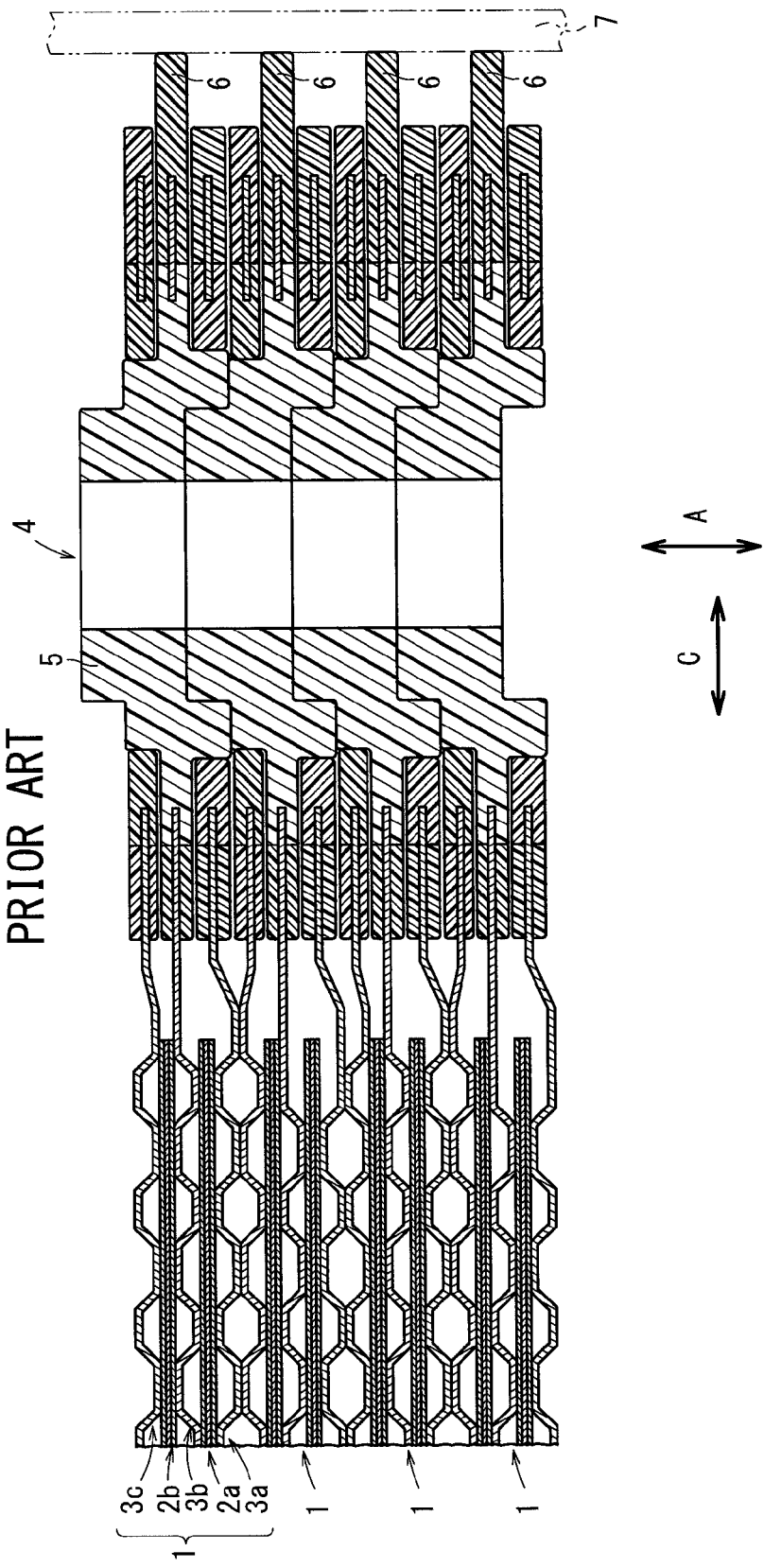
FIG. 16 is a cross sectional view showing the fuel cell stack disclosed in Japanese Laid-Open Patent Publication No. 2009-283469.

As shown in FIG. 13, resin guide members 196b are formed integrally with the frame 158 of the second membrane electrode assembly 146b. Each of the resin guide members 196b includes an outer end 198b, which is exposed to the outside from the recessed portion 200 provided in the resin guide member 196a of the first membrane electrode assembly 146a (see FIG. 15).

Operations of the fuel cell 140 will briefly be described below.

As shown in FIG. 9, the oxygen-containing gas, which is supplied to the oxygen-containing gas supply passage 30a, is supplied to the first oxygen-containing gas flow field 50 through the inlet channels 162 formed in the extension 160a of the first separator 144, and is supplied to the second oxygen-containing gas flow field 66 through the inlet channels 174a formed in the extension 170a of the second separator 148.

After the oxygen-containing gas has flowed through the first oxygen-containing gas flow field 50, the oxygen-containing gas is discharged through the outlet channels 162b formed in the extension 160b of the first separator 144 into the oxygen-containing gas discharge passage 30b. Meanwhile, after the oxygen-containing gas has flowed through the second oxygen-containing gas flow field 66, the oxygen-containing gas is discharged into the oxygen-containing gas discharge passage 30b through the outlet channels 174b formed in the extension 170b of the second separator 148.

The fuel gas, which is supplied to the fuel gas supply passage 32a, is supplied to the first fuel gas flow field 36 through the inlet channels 172a formed in the extension 168a of the second separator 148, and is supplied to the second fuel gas flow field 58 through the inlet channels 184a formed in the extension 180a of the third separator 150.

After the fuel gas has flowed through the first fuel gas flow field 36, the fuel gas is discharged into the fuel gas discharge passage 32b through the outlet channels 172b formed in the extension 168b of the second separator 148. Meanwhile, after the fuel gas has flowed through the second fuel gas flow field 58, the fuel gas is discharged into the fuel gas discharge passage 32b through the outlet channels 184b formed in the extension 180b of the third separator 150.

Further, the coolant supplied to the coolant supply passage 34a is supplied to the coolant flow field 44 through the inlet channels 186a formed in the extension 182a of the third separator 150. After the coolant has flowed through the coolant flow field 44, the coolant is discharged into the coolant discharge passage 34b through the outlet channels 186b formed in the extension 182b.

In the third embodiment, the recessed portions 200 are formed in the outer ends 198a of the resin guide members 196a of the resin frame 158 of the first membrane electrode assembly 146a. Thus, when the fuel cell 140 is assembled, the outer ends 198b of the resin guide members 196b of the resin frame 158 of the second membrane electrode assembly 146b are exposed to the outside through the recessed portions 200. In this structure, the outer ends 198b of the resin guide members 196b can be used for guiding the guide rail, and thus the same advantages as those of the first embodiment are obtained.

Further, as shown in FIG. 14, the knock member 204 is formed integrally with the resin frame 158 of the second membrane electrode assembly 146b. The outer expansion 206a of the knock member 204 is inserted into the knock hole 194a of the second separator 148 and into the knock hole 166a of the first separator 144. In this structure, the load from the first membrane electrode assembly 146a and the second membrane electrode assembly 146b can be received effectively by the first separator 144 and the second separator 148, and thus the rigidity of the fuel cell units 142 as a whole can be improved effectively.

Although a combination of two MEAs and three separators is adopted in the first embodiment, a combination of one MEA and two separators is adopted in the second embodiment, and a combination of two MEAs and two separators is adopted in the third embodiment, the present invention is not limited in this respect. For example, a fuel cell unit, which is made up of a combination of three or more MEAs and four or more separators, may be used.

The invention claimed is:

1. A fuel cell formed by stacking a plurality of fuel cell units each including one or more membrane electrode assemblies and a plurality of separators, the membrane electrode assembly including a pair of electrodes and an electrolyte membrane interposed between the electrodes, resin guide members being provided at outer circumferential portions of the separators, or at outer circumferential portions of the membrane electrode assemblies, at the same position in the stacking direction; and the resin guide members provided in all but one of the separators of the fuel cell unit, or the resin guide members provided in all but one of the membrane electrode assemblies of the fuel cell unit have recessed portions, which are spaced inwardly from outer ends of the resin guide members.

2. The fuel cell according to claim 1, wherein the outer end of the resin guide member protrudes outwardly from an outer circumferential end surface of the separator.

3. The fuel cell according to claim 1, further comprising a coupling member for assembling components together for each of the fuel cell units.

4. The fuel cell according to claim 1, further comprising a casing containing the stacked fuel cell units.

* * * * *